(12) United States Patent
Spehle et al.

(10) Patent No.: US 7,063,006 B1
(45) Date of Patent: Jun. 20, 2006

(54) FIRE PIT GRILL APPARATUS

(76) Inventors: Darlene V. Spehle, W. 5235 Jene Rd., Eau Claire, WI (US) 54701; Joseph W. Spehle, W. 5235 Jene Rd., Eau Claire, WI (US) 54701

( * ) Notice: Subject to any disclaimer, the term of this patent is extended or adjusted under 35 U.S.C. 154(b) by 33 days.

(21) Appl. No.: 10/989,196

(22) Filed: Nov. 15, 2004

(51) Int. Cl.
*A47J 37/00* (2006.01)
*A47J 37/06* (2006.01)
*F24B 3/00* (2006.01)

(52) U.S. Cl. .............. 99/340; 99/448; 99/449; 99/450; 99/482; 126/9 R; 126/25 A; 126/30

(58) Field of Classification Search .............. 99/339, 99/340, 444–450, 481, 482; 126/9 R, 25 R, 126/25 A, 25 AA, 29, 30, 50; 248/156, 431, 248/125.7
See application file for complete search history.

(56) References Cited

U.S. PATENT DOCUMENTS

| | | | | |
|---|---|---|---|---|
| 366,833 A | * | 7/1887 | Hipwell | 248/431 |
| 3,067,734 A | * | 12/1962 | Lucas | 99/450 |
| 3,131,685 A | | 5/1964 | Bergfield | |
| 3,152,536 A | * | 10/1964 | Lucas | 99/397 |
| 3,512,515 A | | 5/1970 | McGee | |
| 4,024,851 A | * | 5/1977 | Boda | 99/340 |
| 4,120,280 A | * | 10/1978 | Iverson et al. | 99/340 |
| 4,146,010 A | * | 3/1979 | Manska | 99/340 |
| 4,269,164 A | * | 5/1981 | Van Grinsven et al. | 99/340 |
| 4,726,349 A | * | 2/1988 | Gehrke | 99/340 |
| 4,732,138 A | | 3/1988 | Vos | |
| D315,846 S | | 4/1991 | Hatzenbeller | |
| 5,025,715 A | * | 6/1991 | Sir | 99/421 HV |
| D337,933 S | * | 8/1993 | Gryz | 7/332 |
| 5,297,534 A | * | 3/1994 | Louden | 99/450 |
| 5,908,026 A | | 6/1999 | Forst | |
| 6,189,529 B1 | * | 2/2001 | Shabazian et al. | 99/450 |
| 6,516,792 B1 | | 2/2003 | McDonald | |
| 6,711,993 B1 | * | 3/2004 | Robertson | 99/448 |

* cited by examiner

*Primary Examiner*—Timothy F. Simone

(57) ABSTRACT

A fire pit grill apparatus includes a housing that has a top wall, a bottom wall and a perimeter wall extending between the top and bottom walls. A motor is mounted in the housing. A drive shaft is mechanically coupled to the motor and is rotated when the motor is turned on. The drive shaft extends through and is rotatably coupled to a panel. Each of a plurality of legs has an upper end pivotally coupled to the panel. A sleeve is positioned on the drive shaft which is selectively couplable along a length of the drive shaft. A plurality of hooks is attached to the sleeve. A grill includes a perimeter edge having a plurality of tethers attached thereto. Each of the tethers is removably attached to one of the hooks to suspend the grill from the drive shaft. The grill is rotated when the motor is turned on.

6 Claims, 4 Drawing Sheets

FIRE PIT GRILL APPARATUS

BACKGROUND OF THE INVENTION

1. Field of the Invention

The present invention relates to grill devices and more particularly pertains to a new grill device for allowing a grill to be supported over a campfire or fire pit and which rotates the grill to ensure that even cooking is provided for food positioned on the grill.

2. Description of the Prior Art

The use of grill devices is known in the prior art. U.S. Pat. No. 5,908,026 describes a device tri-pod assembly for positioning over a campfire and which is adapted for rotating a grill above the camp fire. A similar device is found in U.S. Pat. No. 3,131,685 which describes a mechanized assembly for rotating the grill of a conventional cooking assembly. Yet another type of grill device is U.S. Pat. No. 4,732,138 which includes a suspension apparatus for suspending a grill above a campfire or other source of heat.

While these devices fulfill their respective, particular objectives and requirements, the need remains for a device that has a more stable configuration which, while still allowing a grill to be suspended over a camp fire, provides a more stable configuration to prevent the unwanted swaying of the grill and to offer a greater freedom of vertical movement of the grill to ensure proper cooking temperatures are attained.

SUMMARY OF THE INVENTION

The present invention meets the needs presented above by generally comprising a housing that has a top wall, a bottom wall and a perimeter wall extending between the top and bottom walls. A motor is mounted in the housing. A drive shaft is mechanically coupled to the motor and extends downwardly form the housing. The drive shaft is rotated when the motor is turned on. The drive shaft has a free end. A panel is provided. The drive shaft extends through and is rotatably coupled to the panel. Each of a plurality of legs has an upper end and a lower end. Each of the upper ends is pivotally coupled to the panel. A sleeve is positioned on the drive shaft. The sleeve is selectively positioned between the free end of the drive shaft and the panel. A fastener extends through the sleeve and is adapted for releasably securing the sleeve to the drive shaft. A plurality of hooks is attached to the sleeve. A grill has a perimeter edge. Each of a plurality of tethers is attached to the perimeter edge. Each of the tethers is removably attached to one of the hooks such that the grill is suspended from the drive shaft and is horizontally orientated. The grill is rotated when the motor is turned on.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
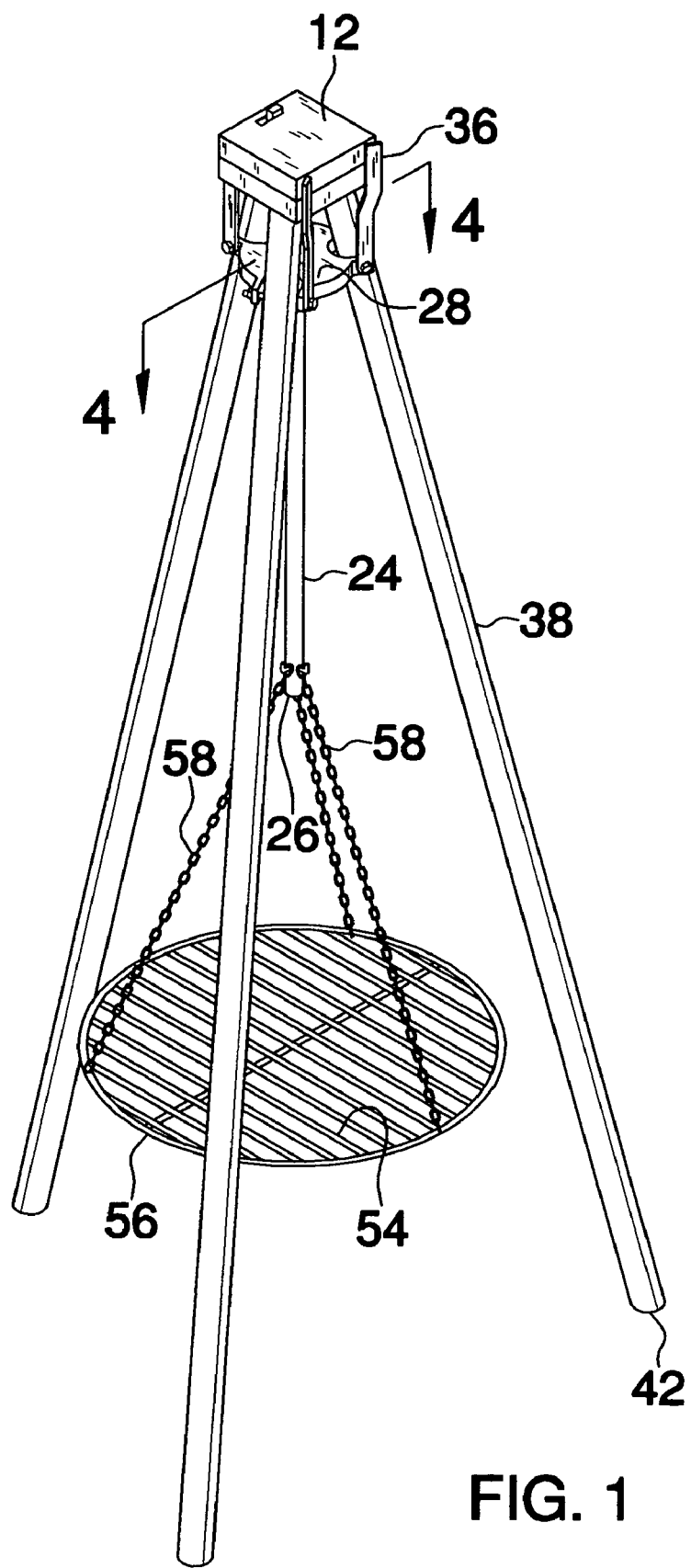
FIG. 1 is a perspective view of a fire pit grill apparatus according to the present invention.
Figure 2:
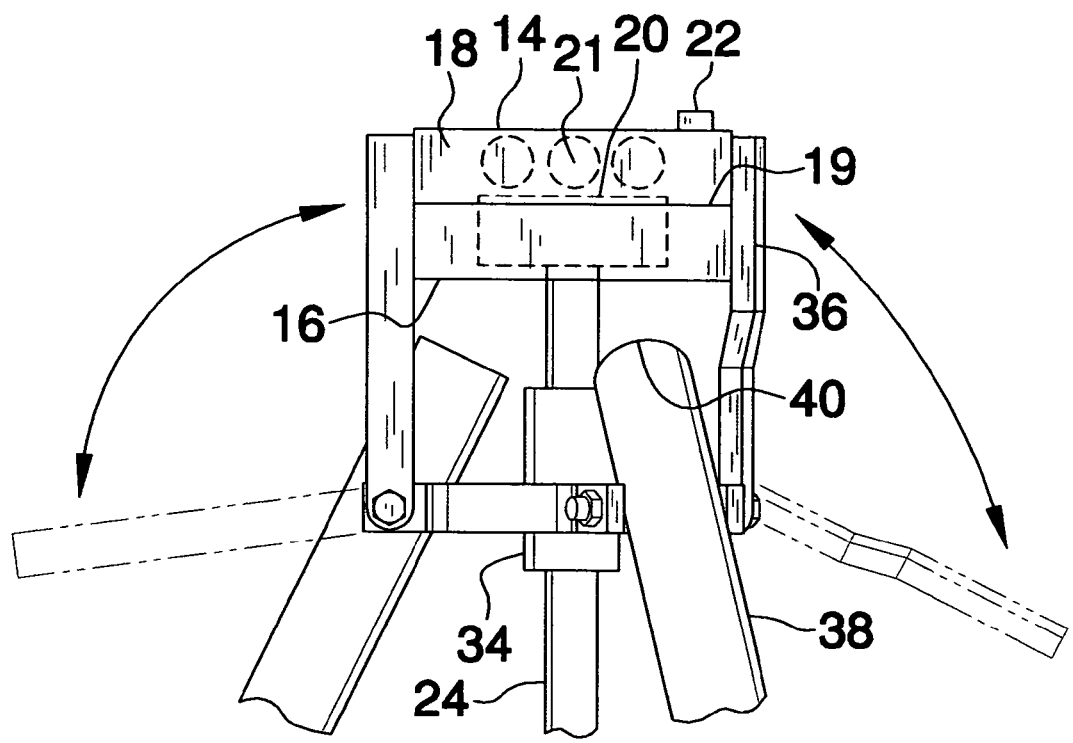
FIG. 2 is a side view of the present invention.
Figure 3:
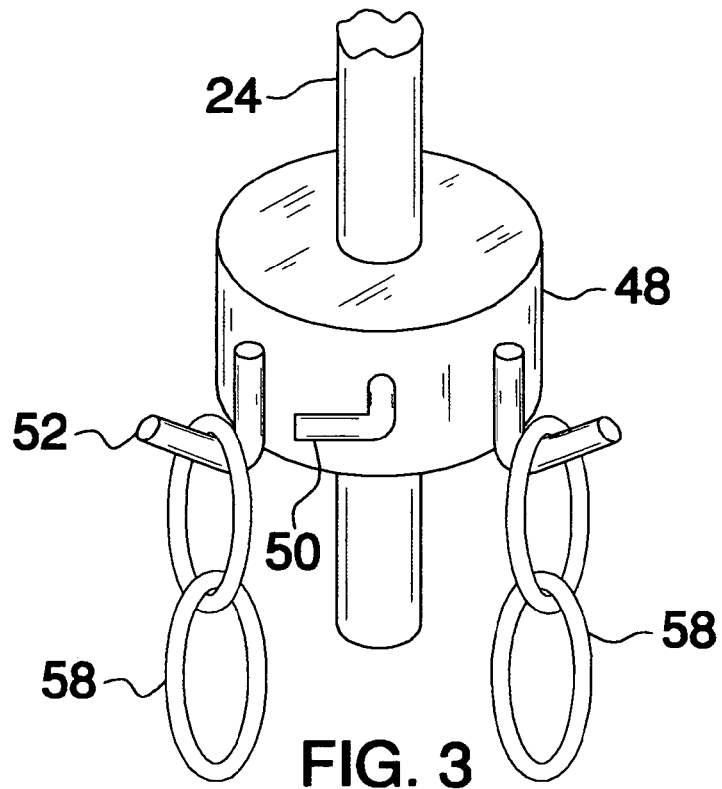
FIG. 3 is a enlarged perspective view of a sleeve of the present invention.
Figure 4:
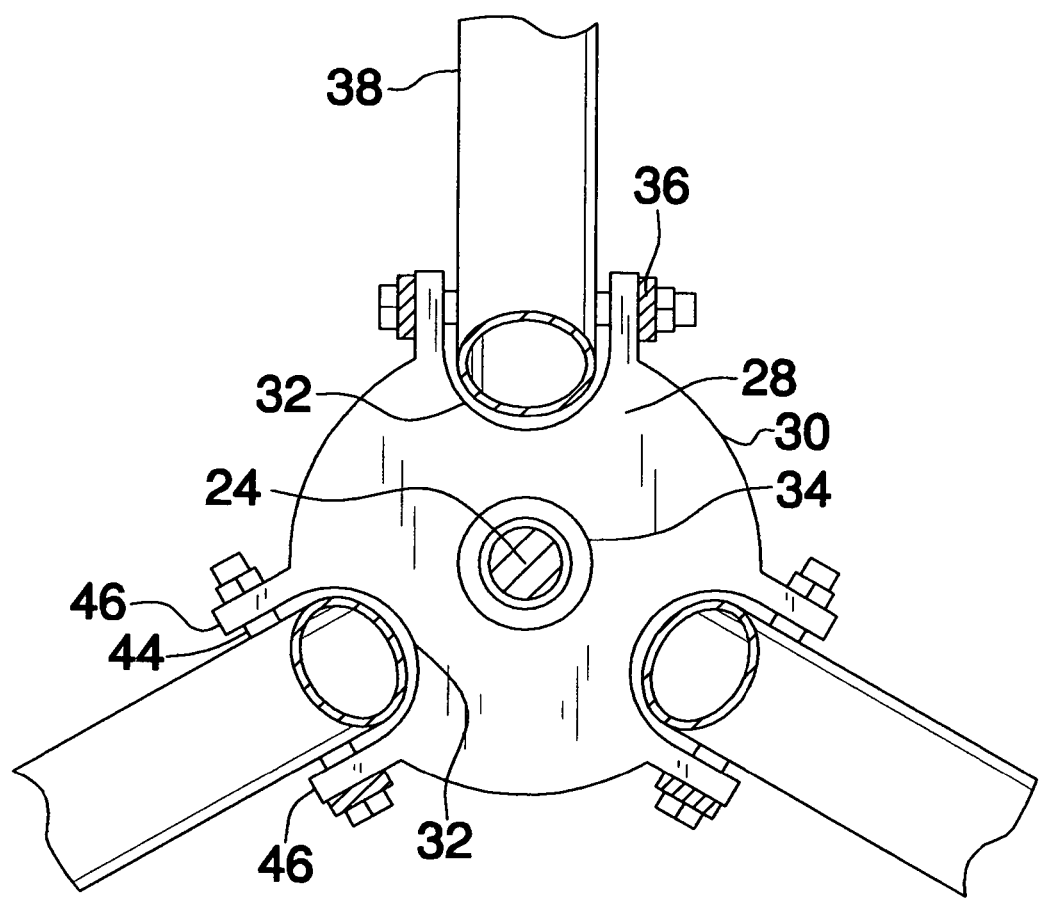
FIG. 4 is a cross-sectional view taken along line 4—4 of FIG. 1 of the present invention.
Figure 5:
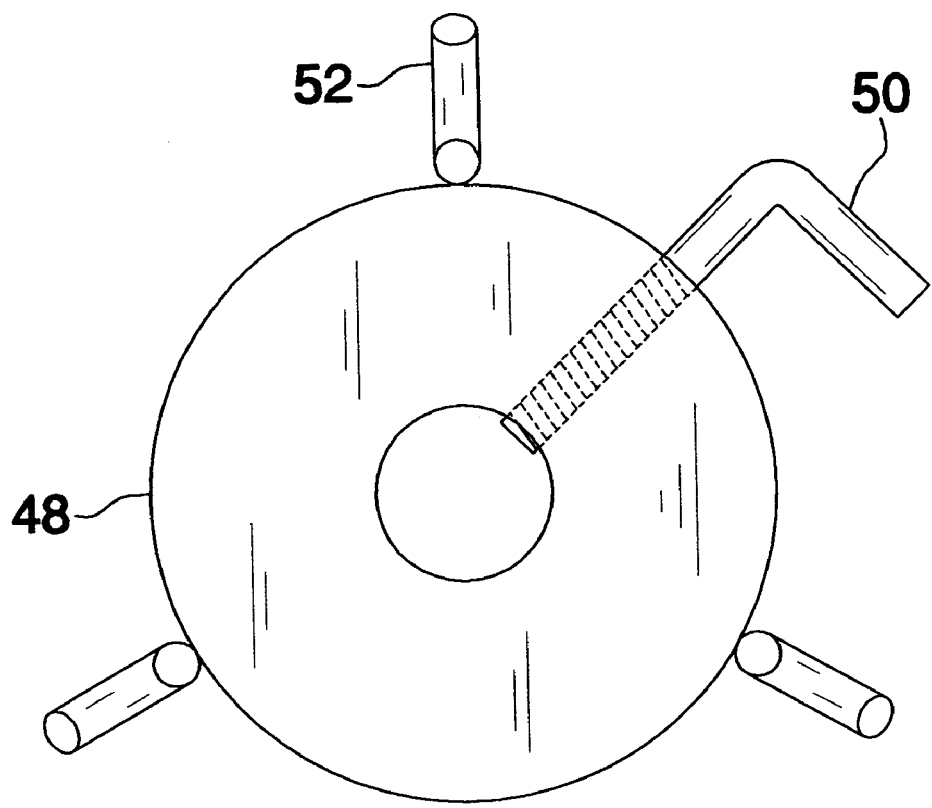
FIG. 5 is a top view of the sleeve of the present invention.
Figure 6:
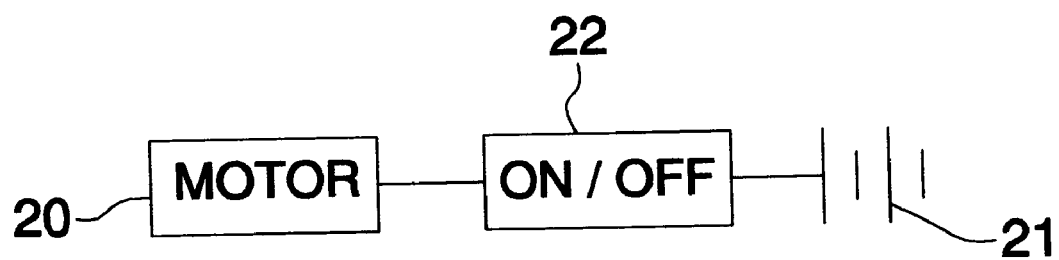
FIG. 6 is a schematic view of the present invention.

With reference now to the drawings, and in particular to FIGS. 1 through 6 thereof, a new grill device embodying the principles and concepts of the present invention and generally designated by the reference numeral 10 will be described.

As best illustrated in FIGS. 1 through 6, the fire pit grill apparatus 10 generally comprises a housing 12 that has a top wall 14, a bottom wall 16 and a perimeter wall 18 extending between the top 14 and bottom 16 walls. A motor 20 is mounted in the housing 12. A power supply 21 is electrically coupled to the motor 20. The power supply 21 is preferably comprised of one or more batteries removably positioned in the housing 12. These can be accessed by a break 22 in the peripheral wall 18. An actuator 22 is operationally coupled to the motor 20 for selectively turning the motor 20 on or off. The actuator 22 is mounted on an outer surface of the housing 12.

A drive shaft 24 is mechanically coupled to the motor 20 and extends downwardly form the housing 12. The drive shaft 24 is rotated about its longitudinal axis when the motor 20 is turned on. The drive shaft 24 has a free end 26. The drive shaft 24 preferably has a length from the free end 26 to the housing 12 generally between 1 foot and 3 feet.

A panel 28 has a peripheral edge 30 that has a plurality notches 32 therein. The notches 32 are equally spaced from each other. The plurality of notches 32 is preferably three notches 32. The drive shaft 24 extends through and is rotatably coupled to the panel 28. This is preferably done with a cylinder 34 attached to the panel 28 through which the drive shaft 24 extends. The cylinder 34 is rotatably coupled to the drive shaft 24. A plurality of stabilizers 36 is attached to the panel 28 and each is selectively abuttable against the housing 12 to resist rotation of the housing 12 with respect to the panel 28.

Each a plurality of legs 38 has an upper end 40 and a lower end 42. Each of the upper ends 40 is positioned in one of the notches 32 and is pivotally coupled to the panel 28. This may be accomplished with a pin 44 extending through arms 46 on either side of the notches 32. The pins 44 are extended through the legs 38. Each of the legs 38 has a length at least one foot longer than the drive shaft 24.

A sleeve 48 is positioned on the drive shaft 24. The sleeve 48 is selectively positioned between the free end 26 of the drive shaft 24 and the panel 28. A fastener 50 extends through the sleeve 48 and is adapted for releasably securing the sleeve 48 to the drive shaft 24. The fastener 50 is preferably a threaded rod that extends through and is threadably coupled to the sleeve 48 and which can be tightened against the drive shaft 24. This allows a person to selectively position the sleeve 48 along the drive shaft 24. A plurality of hooks 52 is attached to the sleeve 48.

A grill 54 is provided which has a perimeter edge 56. Each of a plurality of tethers 58 is attached to the perimeter edge 56. Each of the tethers 58 is removably attached to one of the hooks 52 so that the grill 54 is suspended from the drive shaft 24 and is horizontally orientated. The tethers 58 are each preferably metallic chains.

In use, the legs 38 are placed around a fire so that the housing 12 is positioned over the fire. The legs are pivotable to adjust their positioning with respect to ground contours and to provide a stable base for the housing 12. The sleeve 48 is positioned on the drive shaft 24 so that the grill 54 is positioned at a desired height above the fire. Food is then placed on the grill 54. The motor 20 is turned on so that the grill 54 rotates. The rotation of the grill 54 ensures that the food is alternated over hot and cold spots of the fire.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A grill assembly adapted for cooking food over a campfire, said assembly comprising:
    a housing having a top wall, a bottom wall and a perimeter wall extending between said top and bottom walls;
    a motor being mounted in said housing;
    a drive shaft being mechanically coupled to said motor and extending downwardly from said housing, said drive shaft being rotated when said motor is turned on, said drive shaft having a free end;
    a panel, said drive shaft extending through and being rotatably coupled to said panel;
    a plurality of legs, each of said legs having an upper end and a lower end, each of said upper ends being pivotally coupled to said panel;
    a sleeve being positioned on said drive shaft, said sleeve being selectively positioned between said free end of said drive shaft and said panel;
    a fastener extending through said sleeve and being adapted for releasably securing said sleeve to said drive shaft;
    a plurality of hooks being attached to said sleeve; and
    a grill having a perimeter edge, each of a plurality of tethers being attached to said perimeter edge, each of said tethers being removably attached to one of said hooks such that said grill is suspended from said drive shaft and is horizontally orientated, wherein said grill is rotated when said motor is turned on.

2. The assembly according to claim 1, further including an actuator being operationally coupled to said motor for selectively turning said motor on or off, said actuator being mounted on an outer surface of said housing.

3. The assembly according to claim 1, wherein said drive shaft has a length from said free end to said housing generally between 1 foot and 3 feet, each of said legs having a length at least one foot longer than said drive shaft.

4. The assembly according to claim 1, wherein said panel has a peripheral edge having a plurality notches therein, said notches being equally spaced from each other, said plurality of notches being three notches, each of said upper ends of said legs being positioned in one of said notches.

5. The assembly according to claim 1, further including a plurality of stabilizers being attached to said panel and being selectively abuttable against said housing such that rotation of said housing with respect to said panel is resisted.

6. A grill assembly adapted for cooking food over a campfire, said assembly comprising:
    a housing having a top wall, a bottom wall and a perimeter wall extending between said top and bottom walls;
    a motor being mounted in said housing;
    a power supply being electrically coupled to said motor;
    an actuator being operationally coupled to said motor for selectively turning said motor on or off, said actuator being mounted on an outer surface of said housing;
    a drive shaft being mechanically coupled to said motor and extending downwardly from said housing, said drive shaft being rotated when said motor is turned on, said drive shaft having a free end, said drive shaft having a length from said free end to said housing generally between 1 foot and 3 feet;
    a panel having a peripheral edge having a plurality notches therein, said notches being equally spaced from each other, said plurality of notches being three notches, said drive shaft extending through and being rotatably coupled to said panel;
    a plurality of stabilizers being attached to said panel and being selectively abuttable against said housing such that rotation of said housing with respect to said panel is resisted;
    a plurality of legs, each of said legs having an upper end and a lower end, each of said upper ends being positioned in one of said notches and being pivotally coupled to said panel, each of said legs having a length at least one foot longer than said drive shaft;
    a sleeve being positioned on said drive shaft, said sleeve being selectively positioned between said free end of said drive shaft and said panel;
    a fastener extending through said sleeve and being adapted for releasably securing said sleeve to said drive shaft;
    a plurality of hooks being attached to said sleeve; and
    a grill having a perimeter edge, each of a plurality of tethers being attached to said perimeter edge, each of said tethers being removably attached to one of said hooks such that said grill is suspended from said drive shaft and is horizontally orientated, wherein said grill is rotated when said motor is turned on.

* * * * *